United States Patent [19]

Akimoto et al.

[11] Patent Number: 5,255,049

[45] Date of Patent: Oct. 19, 1993

[54] SHUTTER CONTROL DEVICE FOR CAMERA AND CONTROL METHOD THEREFOR

[75] Inventors: Kazuo Akimoto; Shinji Miyata; Yoshiyuki Iwamatsu; Hiroko Fujita; Mitsuhiro Kakuta; Tomoki Nakamura, all of Chiba, Japan

[73] Assignee: Seikosha Co., Ltd., Tokyo, Japan

[21] Appl. No.: 871,368

[22] Filed: Apr. 20, 1992

[30] Foreign Application Priority Data

Apr. 19, 1991 [JP] Japan .................................. 3-88198

[51] Int. Cl.$^5$ .............................................. G03B 7/08
[52] U.S. Cl. ................................................... 354/439
[58] Field of Search .............. 354/410, 435, 436, 437, 354/438, 439, 440

[56] References Cited

U.S. PATENT DOCUMENTS 5,155,521 10/1992 Bell et al. .......................... 354/439

Primary Examiner—Michael L. Gellner
Assistant Examiner—Howard B. Blankenship
Attorney, Agent, or Firm—Jordan and Hamburg

[57] ABSTRACT

A shutter control device for a camera includes a control arrangement for controlling the opening and closing of the shutter as a function of an exposure value and a diaphragm value. The control arrangement stores values corresponding to a predetermined diaphragm setting, and employs the parameters of the predetermined setting and the exposure value and diaphragm value in order to determine the opening time of the shutter. In another arrangement, the control arrangement determines the effective exposure time as a function of the brightness of the object, distance to the object and a diaphragm, and employs this effective exposure time and a stored correction factor to determine the actual exposure time.

11 Claims, 8 Drawing Sheets

FIG. 5

| Av-VALUE | $h_1/h_2$ | $(h_1^2-h_1^2)/2h_1h_1$ |
|---|---|---|
| F 5.6 | 0.5 | 0.75 |
| F 8 | 0.25 | 1.875 |
| F 11 | 0.125 | 3.9375 |

| Ev-VALUE | OPENING TIME | Ev-VALUE | OPENING TIME | Ev-VALUE | OPENING TIME |
|---|---|---|---|---|---|
| 6.0 | t6.0 | 6.0 | t'6.0 | 6.0 | t"6.0 |
| 6.1 | t6.1 | 6.1 | t'6.1 | 6.1 | t"6.1 |
| 6.2 | t6.2 | 6.2 | t'6.2 | 6.2 | t"6.2 |
| ⋮ | ⋮ | ⋮ | ⋮ | ⋮ | ⋮ |
| 17.0 | t17.0 | 17.0 | t'17.0 | 17.0 | t"17.0 |

TABLE 1
CORRESPONDING TABLE BETWEEN Av VALUE AND α

| Av VALUE | α |
|---|---|
| 9 | 5ms |
| 6 | 63ms |
| 4 | 120ms |

TABLE 2
CORRESPONDING TABLE BETWEEN Av VALUE AND AE PULSE NUMBER

| Av VALUE | AE PULSE NUMBER |
|---|---|
| 9 | 1 |
| 6 | 5 |
| 4 | 10 |

TABLE 3
CORRESPONDING TABLE BETWEEN Av VALUE AND β

| Av VALUE | β |
|---|---|
| 9 | 1.2 |
| 6 | 0.8 |
| 4 | 1.5 |

SHUTTER CONTROL DEVICE FOR CAMERA AND CONTROL METHOD THEREFOR

BACKGROUND OF THE INVENTION

This invention relates to a shutter control device for a camera and a control device therefor, and particularly to a device and a method for controlling the exposure amount and opening time of a shutter for a camera in a diaphragm-priority mode.

An exposure amount (Ev) of a camera is generally dependent on the diaphragm value of the shutter and the opening time therefor, that is, the exposure amount is a function having the diaphragm value of the shutter and the opening time therefor as independent variables. Therefore, the opening time of the shutter is determined by setting the desired exposure amount and the diaphragm value.

An operation of driving a shutter is schematically shown in FIG. 3 wherein the abscissa and ordinate represent the time and aperture area, respectively. In FIG. 3, the shutter starts its opening motion at a point A, is fully opened at a point B, starts its closing motion at a point C after an opening time t elapses, and then is completely closed at a point D. The area of the trapezoid which is enclosed and surrounded by the points A, B, C and D, corresponds to the exposure amount (Ev) for this shutter driving operation. The shutter driving operation which provides such a trapezoidal waveform for the opening and closing operations of the shutter is referred to as "a trapezoid control".

In a conventional method for controlling the opening time of the shutter in which the exposure amount is controlled by a stepping motor, etc., the relationship between the exposure amount (Ev) and the opening time is stored beforehand as a data table as shown in FIG. 6 in a storing unit of a control device, and the opening time for a desired shutter driving operation is determined on the basis of the data table. For example, a data table as shown at the left side of FIG. 6 is used for a shutter driving operation for a full-opened diaphragm (hereinafter referred to as "diaphragm full-opening operation").

When the trapezoid control is carried out in the diaphragm-priority mode, the opening time is varied in accordance with the diaphragm value. For example, if the diaphragm value is set at a value smaller than the value for the full-opened diaphragm in the graph of FIG. 3, the opening time must be set to be longer to obtain the same exposure amount as set for the diaphragm full-opening operation. Therefore, in order to control the opening time with the data table, a data table must be individually prepared in accordance with each of various diaphragm values, for example, diaphragm values such as F4, F5.6, F8, etc., and thus the number of the data tables is greatly increased. In addition, the linearity of a trapezoidal waveform representing opening and closing operations of a shutter for a camera is ordinarily dispersed in accordance with each shutter, and it has been hitherto very difficult to correct the dispersion of the linearity of the trapezoidal waveform.

As previously set forth, the exposure amount (Ev) of a camera is generally determined by the area of a waveform (trapezoidal waveform). FIG. 8 represents a series of shutter driving operations for a period when a shutter starts its opening motion, reaches a predetermined aperture and completed its closing motion. In the so-called trapezoid (trapezoidal waveform) control operation in which the exposure time is controlled on the basis of a predetermined diaphragm value, the shutter is controlled to be opened at a predetermined aperture for a predetermined opening period, and thus an AE pulse data and an analog time data used to determine a time between pulses must be obtained. Therefore, a conventional camera has been equipped with a storing unit in which a data table representing the number of AE pulses and another data table representing an analog opening time are stored for each and every exposure amount (Ev) in accordance with an aperture, and the control of the exposure amount has been carried out with reference to these data tables.

However, such a conventional AE control system requires a data table to be prepared for each and every exposure amount in order to cover all aperture values, and thus the number of the data tables to be prepared is greatly increased. In addition, the linearity of the trapezoidal waveform representing opening and closing states of the shutter is ordinarily dispersed in accordance with a shutter of a camera, and it has been conventionally very difficult to correct the dispersion of the linearity.

SUMMARY OF THE INVENTION

This invention has been implemented to overcome the disadvantages of conventional shutter control systems, and has an object to provide a shutter control device for a camera and a control method therefor.

Another object of the invention is to overcome the difficulties of conventional shutter control systems, and to provide a shutter control device for a camera in which various program controls can be easily carried out using a small amount of data memory.

In order t attain the above objects, a shutter control device for a camera according to one embodiment of this invention includes setting means for setting an exposure amount of a camera, a diaphragm value of a shutter, etc., control means for controlling opening and closing operations and an opening time for the shutter on the basis of a value set by the setting means, and shutter driving means for driving the shutter on the basis of a signal from the control means, wherein the control means performs a calculation of the opening time for the set diaphragm value on the basis of the aperture area for the set diaphragm value for the shutter, the times required for the opening and closing operations, and the opening time and the diaphragm value set by the setting means.

Further, a shutter controlling method according to this embodiment of the invention in which opening and closing operations and an opening time for a shutter are controlled on the basis of the exposure amount of a camera, a diaphragm value of the shutter, etc., which are set beforehand, includes the step of calculating an opening time (t') for the set diaphragm value on the basis of an aperture area (h1), times (t1, t2) required for the opening and closing operations and an opening time (t) for a prescribed diaphragm value, and an aperture area (h2) for the set diaphragm value, thereby performing a control operation of the opening and closing operation and the opening time.

A shutter control device for a camera according to another embodiment of this invention includes measuring means for measuring the brightness of an object and the distance to the object, setting means for setting a diaphragm value of a shutter and so on, and control means for calculating outputs of the measuring means and the setting means to perform a control operation of the shutter, in which the control means includes storing means for storing a conversion factor between an effective exposure time (Tv) calculated on the basis of outputs of the control means and the measuring means and the shutter-opening time (T) of the shutter, and serves to calculate the effective exposure time (Tv) on the basis of a value set by the measuring means and the setting means, and to calculate the shutter-opening time (T) on the basis of the conversion factor stored in the storing means.

Preferably, a correction value ($\beta$) inherent to the shutter is set beforehand in the storing means provided with the control means, and the shutter-opening time (T) is calculated on the basis of the correction value ($\beta$).

BRIEF DESCRIPTION OF THE DRAWINGS

FIG. 5 shows an example of a data table used in this embodiment of the invention.

FIG. 6 shows a data table which is required for a conventional shutter control.

FIG. 10 shows an example of a data table used in this invention.

DESCRIPTION OF THE PREFERRED EMBODIMENTS

A first embodiment of the shutter control device for a camera according to this invention will be described hereunder with reference to the accompanying FIGS. 1 to 6.

Figure 1:
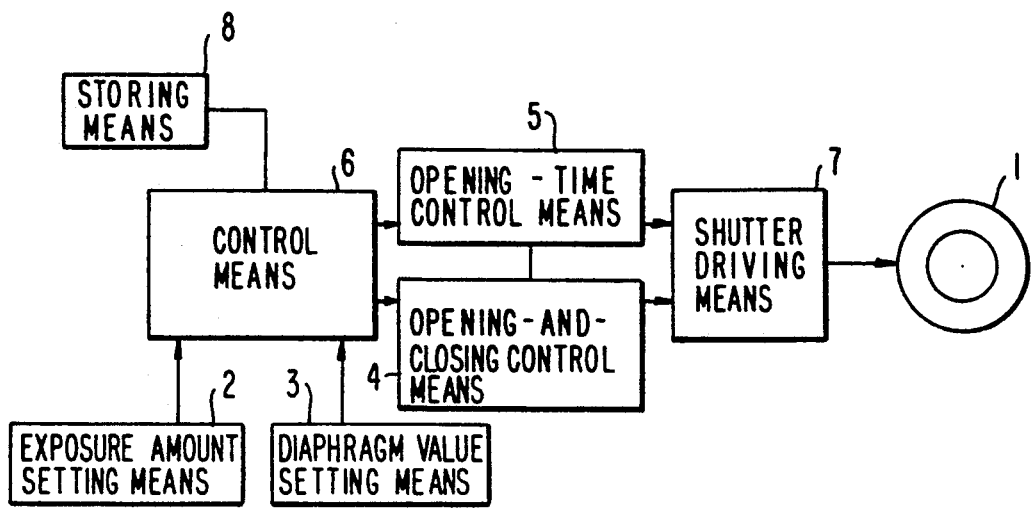
FIG. 1 is a block diagram of one embodiment of the shutter control device for a camera according to this invention.

As shown in FIG. 1, the shutter control device for a camera according to this embodiment of the invention includes setting means comprising exposure amount setting means 2 for setting the exposure amount of a shutter 1 and diaphragm setting means 3 for setting the diaphragm value, control means comprising opening-and-closing control means 4 for controlling opening and closing operations of the shutter, opening-time control means 5 for controlling the opening time of the shutter and control means 6 for performing a prescribed calculation on the basis of signals from the exposure setting means 2 and the diaphragm value setting means 3 to control the opening-and-closing control means 4 and the opening-time control means 5, and shutter driving means 7 for driving the shutter 1 on the basis of signals from the opening-and-closing control means 4 and the opening-time control means 5.

The shutter driving means 7 comprises an AC motor, for example, a motor such as a stepping motor, and a motor driver. The shutter 1 is a lens shutter which also serves as a diaphragm and includes plural sectors whose opening and closing operations are carried out by a rotational motion of the motor of the shutter driving means 2 in forward and reverse directions. The shutter driving means 7 serves to carry out the opening and closing operations of the shutter sectors through the control of the opening-and-closing control means 4 and the opening-time control means 5. The exposure and diaphragm operations are carried out by keeping the shutter 1 at an opening state with a prescribed aperture for a prescribed time.

The exposure amount setting means 2 detects various information such as brightness of an object, film sensitivity, exposure correction, etc., and outputs a signal representing an exposure amount to the control means 6 through calculation of the exposure amount or a manual setting. The diaphragm value setting means 3 sets a diaphragm value through a manual setting, or detects various conditions to automatically set the diaphragm value, and outputs a signal representing the diaphragm value to the control means 6.

The control means 6 carries out a calculation as described later on the basis of the signals from the exposure amount setting means 2 and the diaphragm value setting means 3 to determine a forward/reverse rotation amount of the motor and an opening time for the diaphragm value and the exposure value which have been set, and outputs signals representing the determined rotation amount of the motor and opening time to the opening-and-closing control means 4 and the opening-time control means 5, respectively. The control means 6 is preferably equipped with a non-volatile storing means 8 such as an EEPROM, in which data required for the calculation, such as the opening time for each exposure amount in a shutter full-opening operation, the shutter aperture area for each diaphragm value, the correction value inherent to the shutter, etc., are stored beforehand.

The opening-and-closing control means 4 controls the driving time for each of the forward and reverse rotational motions, or a driving voltage, a driving current, a pulse of the motor if the motor is a stepping motor, etc., on the basis of the signal representing the forward/reverse rotation amount of the motor which is supplied from the control means 6, and outputs an instruction to the shutter driving means 7. The opening-time control means 5 controls a timing for the switching operation between the forward and reverse rotational motions of the motor on the basis of the signal representing an opening time which is supplied from the control means 6.

Figure 2:
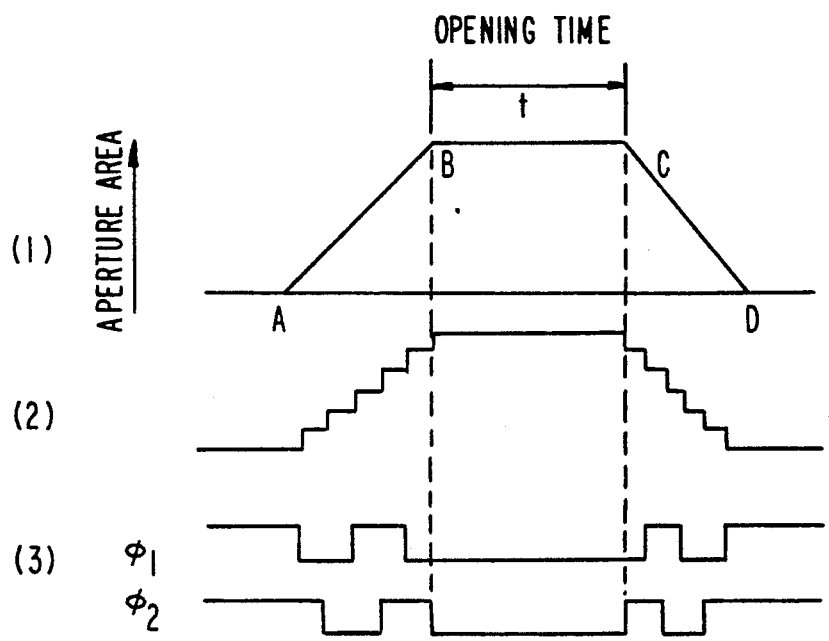
FIG. 2 is a graph showing the shutter driving operation and the driving state of a motor.

A driving operation of the shutter thus constructed will be described with reference to FIG. 2, representatively using an embodiment where the driving operation is carried out by a stepping motor. The abscissa and ordinate of the graph of FIG. 2 represent the time and aperture area of the shutter (a value corresponding to a diaphragm value).

The motor is first driven in a forward rotational direction on the basis of the signal from the opening-and-closing control means 4, and the shutter sectors start their opening motion. Here, the forward rotational motion of the motor is carried out while the phases ($\Phi_1$, $\Phi_2$) of the motor are alternately switched as illustrated, and the opening area of the shutter is determined on the basis of the number of switching pulses for the phase switching operation of the motor. The shutter sectors continue their opening motions until the motor is rotated by a prescribed rotation amount and the shutter has an aperture area which is set by the diaphragm setting means 3. Thereafter, the rotational motion of the motor is stopped, and the two phases ($\Phi_1$, $\Phi_2$) are retained for a prescribed period on the basis of the signal from the opening-time control means 5. Subsequently, the alternate switching operation between the phases ($\Phi_1$, $\Phi_2$) is restarted to drive the motor in the reverse rotational direction until the shutter is completely closed. FIG. 2, represents the point where the shutter starts its opening motion, the point where the shutter is opened at a prescribed amount, a point where the shutter starts its closing motion and the point where the shutter is completely closed by A, B, C and D. The area which is surrounded by the four points A, B, C and D and the abscissa corresponds to the exposure amount. The control means 6 determines the opening time in such a manner that through the calculation as described below, the exposure amount is equal to the value set by the exposure setting means 2, and controls the opening-time control means 5 on the basis of the calculated opening time.

The calculating operation of the control means 6 will be described hereinafter.

Figure 3:
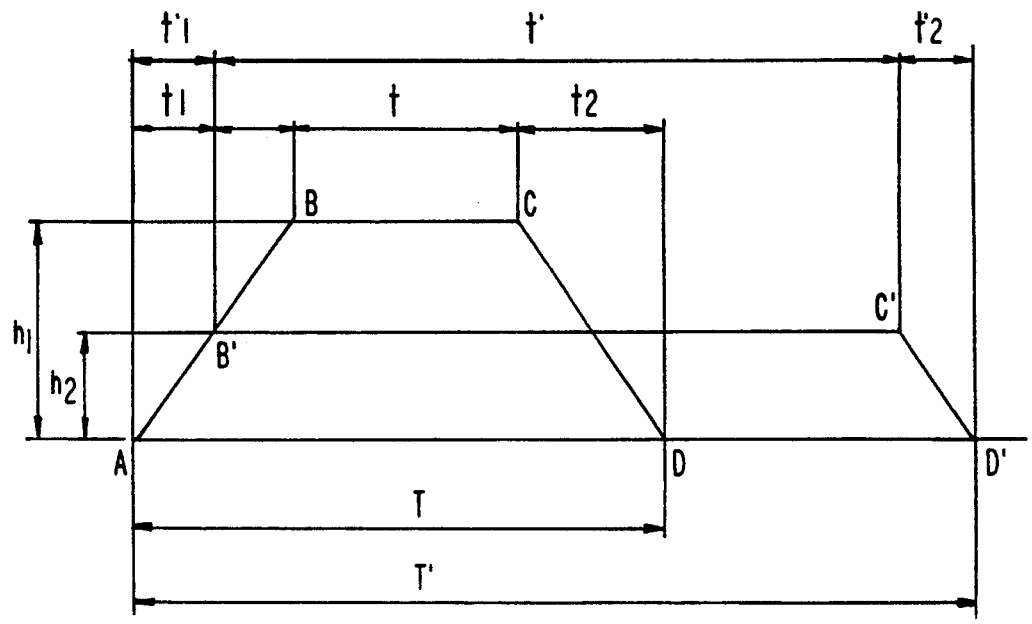
FIG. 3 is a graph showing the shutter driving operations for a diaphragm full-opening operation and an opening operation of a small diaphragm value.

FIG. 3 is a graph showing the driving operation of the shutter which is similar to that of FIG. 2. In FIG. 3, the trapezoid ABCD represents an opening waveform in a diaphragm full-opening operation; a trapezoid A'B'C'D', an opening waveform for a set diaphragm value (a small diaphragm value); h1 and h2, maximum aperture areas for the trapezoids ABCD and A'B'C'D', respectively; t and t', opening times in a maximum opening state for the trapezoids ABCD and A'B'C'D', respectively; t1 and t'1, times required for a shift from the opening-start state till the maximum-opening state for the trapezoids ABCD and A'B'C'D', respectively; and t2 and t'2, times required for a shift from the maximum opening state till the completely-closing state for the trapezoids ABCD and A'B'C'D', respectively. Representing total times of the shutter from the opening-start time till the completely-closing time for the trapezoids ABCD and A'B'C'D' by T and T' respectively, the following equation is satisfied:

$$T = t + t1 + t2, \quad T' = t' + t'1 + t'2$$

Assuming that the exposure amount (Ev) for a full-opened diaphragm is equal to the exposure amount (Ev) for a set diaphragm value, the following equation is satisfied:

$$EV = \frac{(t + T)}{2} \times h1 = \frac{(t' + T')}{2} \times h2$$

If a motor driving condition set by the opening-and-closing control means 4 is identical between the trapezoids ABCD and A'B'C'D', the inclination between a line AB is equal to the inclination of a line A'B' and the inclination between a line CD is equal to a line C'D', and in addition h1 : h2 = t1 : t'1 = t2 : t'2. From this relation and the above equation, the following equations are satisfied:

$$\frac{(2t + t1 + t2)}{2} \times h1 = \frac{2t' + h2/h1(t1 + t2))}{2} \times h2$$

$$t' = \frac{h1}{h2} t + \frac{h1^2 - h2^2}{2h1h2}(t1 + t2)$$

Therefore, the opening time t' for the set diaphragm value can be obtained with the aperture area h2 for the set diaphragm value, and the opening area h1, the opening time t and (t1+t2) for the full-opened opened diaphragm. In this case, h1 and (t1+t2) are data for the full-opened diaphragm, and thus may be obtained beforehand as values inherent to the shutter. The opening time t is determined by a desired exposure amount (Ev), and thus the time data for each exposure amount may be stored beforehand as a data table as shown in FIG. 5 in the storing means 8 of the control means 6, or it may be calculated as a function of the exposure amount. The aperture area h2 is a value for the set diaphragm value (Av), and thus the aperture-area data for each diaphragm value may be stored beforehand in the storing means 8 of the control means 6 like the opening time data, or it may be calculated as a function of the diaphragm value.

The control means 6 outputs a signal representing the opening time t' for the set diaphragm value to the opening-time control means 5, and controls the shutter opening operation.

The shutter driving operation as described above is satisfied in an ideal case where no dispersion occurs in the linearity of the opening waveforms. However, in an actual exposure operation, the dispersion of the opening area and non-linearity of the opening and closing operations frequently occur. A correcting operation for these actual cases will be next described.

Figure 4:
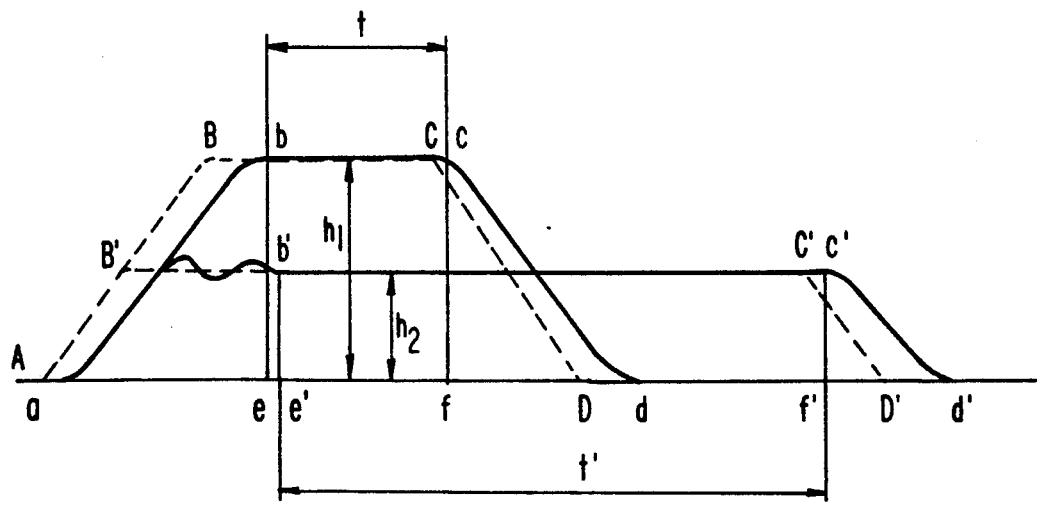
FIG. 4 is a graph showing the shutter driving operation which requires correction.

FIG. 4 is a graph showing operation of the shutter similar to that of FIG. 3. In FIG. 4, the solid line represents the opening waveform of an actual shutter which deviates from an ideal state as indicated by the broken line. The figure abcd is the opening full-opened for the diaphragm, and the figure a'b'c'd' is an opening waveform for a set diaphragm value. The same reference numerals as those of FIG. 3 represent the same parts.

Assuming that an exposure amount for the full-opened diaphragm is equal to that for the set diaphragm value, the following equation is satisfied:

$$EV = (\text{area of } abe) + (\text{area of } cdf) + (\text{area of } cdf)$$
$$= (\text{area of } a'b'e') + (\text{area of } b'c'f'e') + (\text{area of } c'd'f')$$

Assuming that $\Delta Ev = \{(\text{area of } abe) + (\text{area of } cdf)\} - \{(\text{area of } a'b'e') + (\text{area of } c'd'f')\}$, (area of bcfe) = h1 × t, and (area of b'c'f'e') = h2 × t', and thus t' = (h1 × t + $\Delta Ev$)/h2.

h1 and $\Delta Ev$ are values inherent to the shutter, and obtained through an actual measurement, t represents an opening time for the set exposure amount in the diaphragm full-opening operation, and it may be stored beforehand as a data for each exposure amount in the storing means 8 of the control means 6 or may be calculated as a function of the exposure amount. The aperture area h2 is a value corresponding to the set diaphragm value (Av), and it may be stored beforehand as a data for each diaphragm value in the storing means 8 of the control means 6 or may be calculated as a function of the diaphragm value. Therefore, by storing beforehand values of $\Delta Ev$ in the storing means 8, the correction can be easily performed, and thus shutter control can be accurately carried out.

The area of ab'e' of ΔEv is set in consideration of a phenomenon occurring from the point a to the point b'where a shutter bound is stabilized, and thus an inherent error for each aperture area can be corrected.

In this embodiment, the opening time t' in the maximum opening state of the shutter is calculated, however, in place of this calculation an effective opening time for which the shutter starts its opening motion and completes its closing motion may be calculated.

As is apparent from the above embodiment, according to the shutter control device for a camera and the shutter controlling method for a camera of this invention, the trapezoid control for plural diaphragm values can be performed with a small amount of data, and thus a data ROM having a small capacity can be used. In addition, according to this invention, the correction of various errors such as an error of the opening time due to the dispersion of a diaphragm or aperture area, an error due to the deviation in linearity of the opening and closing operations, etc. can be easily made by storing beforehand a correction amount inherent to the shutter in an EEPROM or the like, and the shutter control can be accurately performed.

Another embodiment of a shutter control device for a camera according to this invention will be hereunder described with reference to the accompanying FIGS. 7 to 13.

Figure 7:
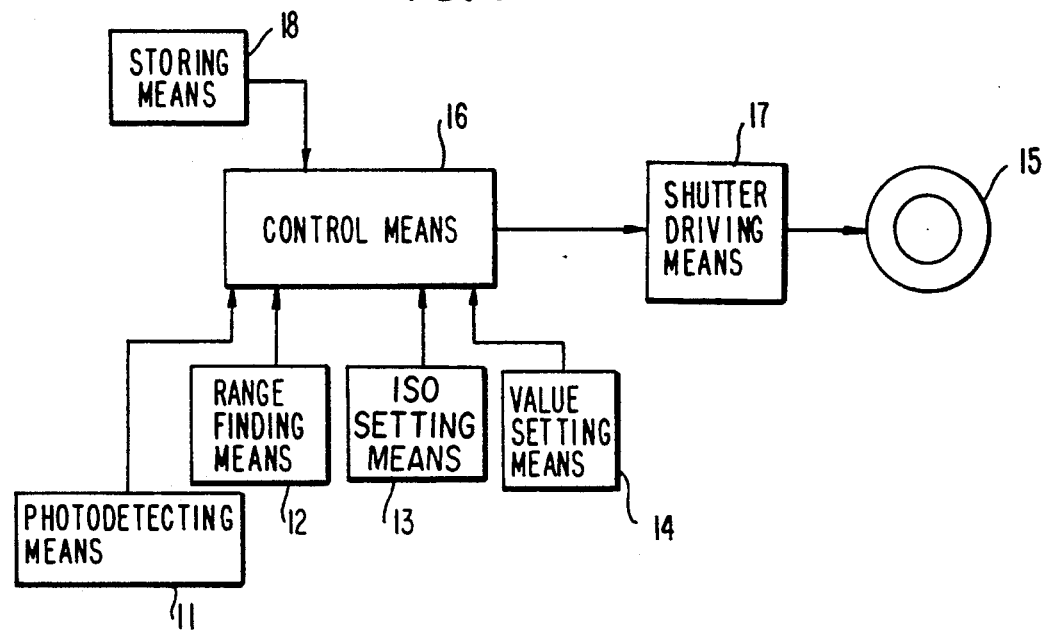
FIG. 7 is a block diagram of another embodiment of the shutter control device for a camera according to this invention.

As shown in FIG. 7, the shutter control device for a camera 1 includes measuring means comprising photodetecting means 11 for photometrically detecting the brightness of an object and range finding means 12 for measuring the distance to the object, setting means comprising ISO setting means 13 for setting film-sensitivity information and diaphragm-value setting means 14 for setting the diaphragm value, control means 16 for calculating the outputs of the measuring means and the setting means and controlling the opening time of the shutter, shutter driving means 17 for driving the shutter 15 on the basis of the output of the control means 16, and storing means 18 for storing predetermined data required for the calculation.

In this embodiment, the shutter 15 is a lens shutter which also serves as a diaphragm, and includes plural sectors whose opening and closing operations are carried out in accordance with forward and reverse rotational motions of a motor serving as the shutter driving means 17. Shutter and diaphragm driving operations are carried out by allowing the shutter to be opened at a predetermined aperture for a predetermined period.

The photodetecting means 11 serves to measure the brightness (Bv) of the object using a photosensitive element. The range finding means 12 comprises, for example, a light emitting element for irradiating light such as infrared rays to the object and a photosensitive element for receiving the light reflected from the object, and serves to measure the distance (Dv) between the camera and the object. The ISO setting means 13 serves to set film-sensitivity information (Sv) through a manual setting switch or a read-out of a DX code of a film cartridge.

The diaphragm value setting means 14 serves to manually set the diaphragm value or automatically set the diaphragm value on the basis of the measured value of the range finding means 12 and the set value of the ISO setting means 13, and output a signal corresponding to the diaphragm value to the control means 16. The diaphragm value setting means 14 may be contained in the control means 16 if it automatically sets the diaphragm value.

The control means 16 serves to subject the outputs of the photodetecting means 11, the range finding means 12, the ISO setting means 13 and the diaphragm setting means 14 to a calculation processing as described below to thereby determine the shutter-opening time for the set diaphragm value and exposure amount and output a signal corresponding to the determined shutter-opening time to the shutter driving means 17.

The storing means 18 preferably comprises a non-volatile ROM such as an EEPROM, and stores various data required for the calculation, such as data for a shutter-opening pulse (AE pulse) corresponding to each aperture value, data for calculation of an analog time, data for the difference ($\alpha$) between the calculated effective exposure time (Tv) and the shutter-opening time (T), shutter-opening inclination (k), correction value ($\beta$) of the shutter-opening inclination, etc. The shutter driving means 17 comprises a motor such as a DC motor, a stepping motor or the like, and a motor driver, and serves to drive opening and closing operations of the shutter sectors controlled by the control means 16.

Figure 8:
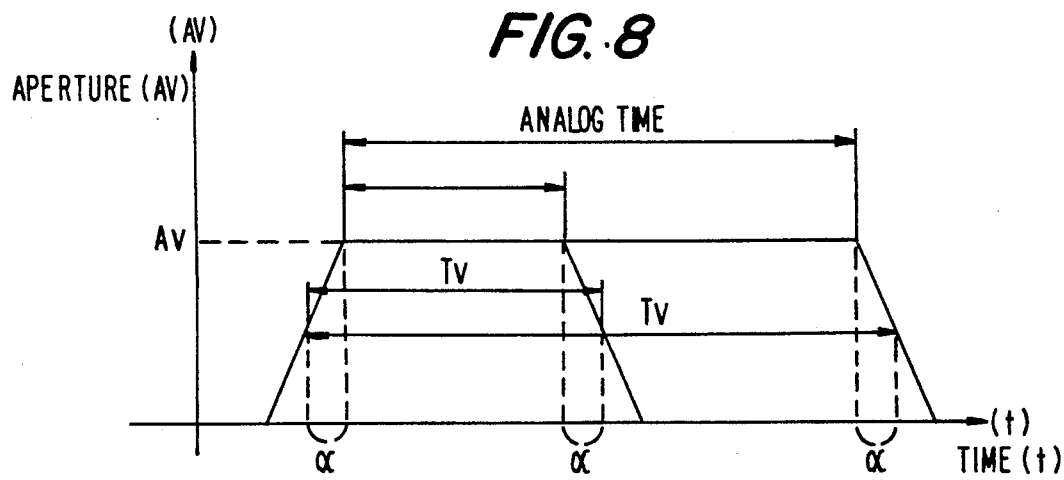
FIG. 8 is a schematic diagram showing the shutter operation.
Figure 9:
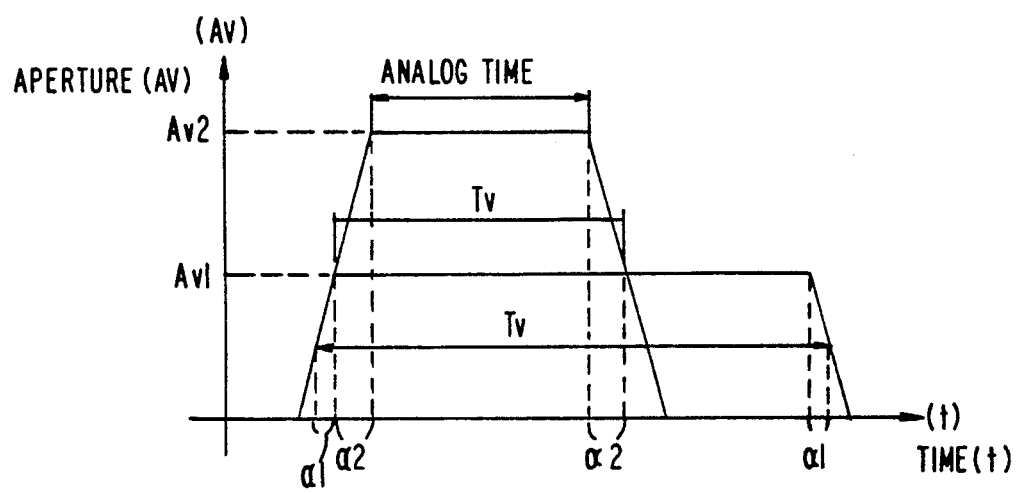
FIG. 9 is another schematic diagram showing the shutter operation.

The calculation of the analog opening time (T) of the shutter in the control means 16 will be next described with reference to FIGS. 8 and 9. In FIGS. 8 and 9 the abscissa and ordinate represent time and aperture (Av) of the shutter, respectively.

First, the output of the photodetecting means which represents the brightness (Bv) of the object, and the outputs of the ISO setting means which represents the film-sensitivity information (Sv) are calculated to obtain an exposure amount (Ev) using the following equation:

$$Ev = Bv + Sv$$

Subsequently, the output of the range finding means 12 which represents the distance (Dv) to the object and the output representing the film-sensitivity information (Sv) are calculated to obtain an aperture value (Av) using the following equation:

$$AV = DV + Sv$$

If the aperture is required to be determined independently of the result of the range finding, it is determined with a diaphragm value which has been set without the above calculation. An effective exposure amount (Tv) is further calculated from the exposure amount (Ev) and the aperture value (Av) thus obtained, in accordance with the following equation:

$$Tv = Ev - Av$$

In an isosceles trapezoidal waveform, if the aperture of the shutter (Av) is constant, the difference ($\alpha$) between the effective exposure amount (Tv) and the analog opening in time (T) would be constant as indicated by the following equation:

$$T = Tv - 2\alpha$$

Figure 11:
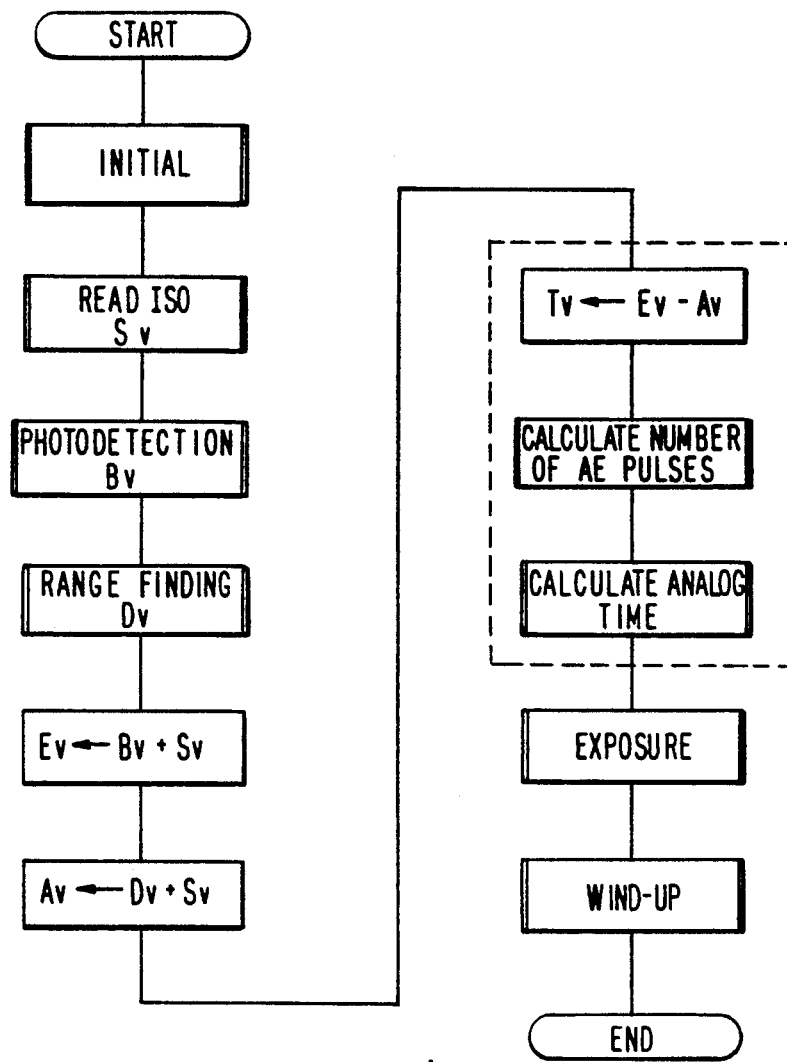
FIG. 11 is a flowchart for a shutter control of this invention.

Therefore, when a data table representing a correspondence relationship between an $\alpha$-value and an aperture value as shown in FIG. 10 (Table 1) is stored beforehand in the storing means 18, the analog opening time (T) can be obtained by reading out the $\alpha$-value from the data table, and carrying out the above calculation (FIG. 11). In addition, since the data of an AE pulse corresponding to each aperture value (Av) is stored beforehand in the storing means 18 as shown in FIG. 10 (Table 2), the trapezoid control can be performed on the basis of the calculated analog opening time (T) and the AE pulse. Alternatively, since the difference ($\alpha$) between the effective exposure amount (Tv) and the analog opening time (T) is proportional to the aperture value (Av) if the shutter-opening inclination is constant (FIG. 9), the analog opening time (T) may be obtained by storing beforehand a proportional constant (k), that is, a shutter-opening inclination in this case in the storing means, and reading out the proportional constant (k) to perform the following calculation:

$$T = Tv - 2kAv$$

Figure 12:
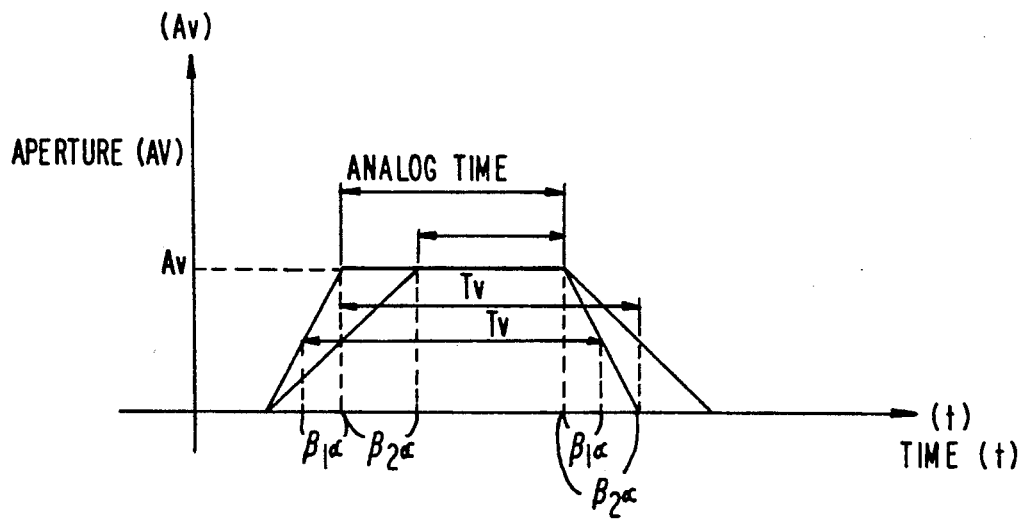
FIG. 12 is a schematic diagram of a shutter operation which requires correction.
Figures 13A, 13B:
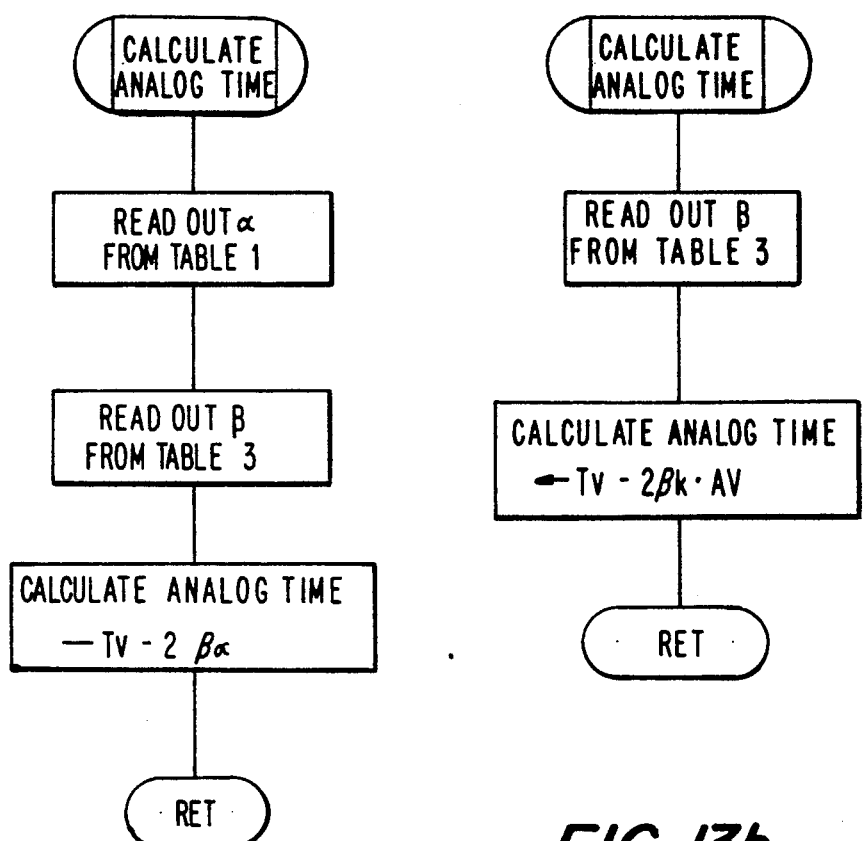
FIGS. 13(a) and 13(b) are flowcharts for the shutter control of this invention.

The above operation is possible in the case where the shutter operation is ideally carried out. However, there are some cases where the shutter-opening inclination is not uniform in an actual shutter (FIG. 12). In such a case, a correction inherent to the shutter is required to be made in accordance with the aperture. In order to satisfy this requirement, data of correction values ($\beta$) corresponding to aperture values are stored beforehand in the storing means 8 as shown in FIG. 10 (Table 3), and the analog opening time (T) is obtained from the following equations:

$$T = Tv - 2\beta\alpha \text{ or } T = Tv - 2\beta kAv \text{ (FIG. 13(a) or FIG. 13(b))}.$$

The shutter driving operation in the control system as set forth above will be described next.

First, the shutter motor is rotationally driven in a forward rotational direction on the basis of a signal from the control means 16, so that the shutter sectors start their opening motion. An aperture value (Av) of the shutter is determined by the number of AE pulses which have been stored in the storing means 18. The opening operation of the shutter sectors is continued until the motor is rotated by a desired rotation amount so that the shutter has a calculated aperture value (Av). When the shutter has the calculated aperture value (Av), the rotational driving of the motor is stopped, and the opening of the shutter is kept for a calculated analog opening time (T). Subsequently, the shutter motor is rotationally driven in a reverse direction to close the shutter.

As is apparent from the above embodiment, according to the shutter control device of this invention, the trapezoid control operation can be carried out with a fixed data including only the AE pulse data, and thus a data ROM having a small capacity can be used. In addition, according to this invention, since a correction amount inherent to a shutter is stored beforehand in the EEPROM, the error of a shutter-opening inclination of an individual shutter can be easily corrected, and a proper shutter control operation can be carried out at all times.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What we claim is:

1. In a shutter control device for a camera, comprising setting means for determining the exposure value of the camera and the diaphragm value of the shutter for a given scene, control means for controlling the opening and closing operations and the opening time for the shutter on the basis of the values determined by said setting means, and shutter driving means for driving said shutter on the basis of a signal from said control means, the improvement wherein said control means comprises means for determining the opening time for the shutter for a predetermined diaphragm value with said exposure value, means for determining the opening time of the shutter as a function of the aperture area for the set diaphragm value of the shutter determined by said setting means, the times required for the opening and closing operations of the shutter for said predetermined diaphragm value, and the opening item for said predetermined diaphragm value.

2. A shutter control device as claimed in claim 1, wherein said control means comprises storing means for storing an opening time for every exposure amount for a prescribed diaphragm value of the shutter and a correction value inherent to the shutter.

3. In a shutter controlling method for controlling the opening and closing operations and the opening time for a shutter on the basis of the exposure value of a camera and the diaphragm value of the shutter, which are preset, the improvement comprising the steps of calculating the opening time (t') for the set diaphragm value on the basis of an aperture area (h1) the times (t1, t2) required for the opening and closing operations and the opening time (t) for a prescribed diaphragm value, and the aperture area (h2) for the set diaphragm value, and controlling the opening and closing operations and the opening time on the basis of the results of said calculating step.

4. In a shutter controlling method for controlling the opening and closing operations and the opening time for a shutter on the basis of the exposure value of a camera and the diaphragm value of the shutter, which are preset, the improvement comprising of calculating the opening time (t') for the set diaphragm value on the basis of an aperture area (h1), the times (t1, t2) required for the opening and closing operations and the opening time (t) for a prescribed diaphragm value, an aperture area (h2) for the set diaphragm value and a correction value inherent to the shutter, and controlling the opening and closing operations and the opening time on the basis of the results of said calculating step.

5. In a shutter control device for a camera including measuring means for measuring brightness of an object and distance to the object, setting means for determining the diaphragm value of a shutter, and control means for receiving the outputs of said measuring means and said setting means to control operation of the shutter, the improvement wherein said control means comprises means for determining an effective exposure time as a function of the outputs of said setting means and measuring means, storing means for storing a conversion factor between said effective exposure time and an analog shutter-opening time of the shutter, and wherein said control means further comprises means for determining an analog shutter-opening time for the shutter as a function of said effective exposure time and said conversion factor, whereby said control means controls said shutter to be open for said analog shutter-opening time.

6. A shutter control device as claimed in claim 5, wherein said storing means contains a correction value inherent to the shutter as stored data.

7. In a shutter control device for a camera, comprising setting means for determining the exposure value of the camera and the diaphragm value of the shutter for a given scene, control means for controlling the opening and closing operations and the opening time for the shutter, and shutter driving means for driving said shutter with the output of said control means, the improvement wherein said control means comprises means for determining the opening time for the shutter at a predetermined diaphragm value different from said determined value, means for determining the opening time of the shutter at said determined value as a function of the opening time and times required for the opening and closing operations of the shutter at said predetermined diaphragm value and the diaphragm value determined by said setting means, said driving means comprising means for holding said shutter open for said determined opening time.

8. The shutter control device of claim 7 wherein said control means further comprises means for determining said determined opening time as a function of a correction value corresponding to difference opening and closing characteristics of said shutter at different diaphragm values.

9. In a shutter control device for a camera including measuring means for measuring brightness of an object and distance to the object, setting means for determining the diaphragm value of a shutter, control means for receiving the outputs of said measuring means and said setting means to provide output control signals, and drive means responsive to said control signals for controlling the opening and closing of said shutter, the improvement wherein said control means comprises means for determining an effective exposure time as a function of the outputs of said setting means and measuring means, storing means for string a conversion factor between said effective exposure time an analog shutter-opening time of the shutter, and wherein said control means further comprises means for determining an analog shutter-opening time for the shutter as a function of said effective exposure time and said conversion factor, whereby said drive means controls said shutter to be open for said analog shutter-opening time.

10. The shutter control device of claim 9 wherein said storing means stores a difference between said effective shutter opening time and the actual shutter-opening time of said shutter, as said conversion factor.

11. The shutter control device of claim 9 wherein said storing means stores a value corresponding to shutter opening inclination as said conversion factor.

* * * * *